US006705944B2

(12) United States Patent
Luciano

(10) Patent No.: US 6,705,944 B2
(45) Date of Patent: Mar. 16, 2004

(54) MULTIPLE GAME APPARATUS AND METHOD

(75) Inventor: Robert A. Luciano, Reno, NV (US)

(73) Assignee: Sierra Design Group, Reno, NV (US)

( * ) Notice: Subject to any disclaimer, the term of this patent is extended or adjusted under 35 U.S.C. 154(b) by 0 days.

(21) Appl. No.: 10/261,557

(22) Filed: Sep. 30, 2002

(65) Prior Publication Data

US 2003/0027628 A1 Feb. 6, 2003

Related U.S. Application Data

(62) Division of application No. 09/527,705, filed on Mar. 17, 2000.

(60) Provisional application No. 60/126,052, filed on Mar. 23, 1999.

(51) Int. Cl.[7] .................................................. A63F 13/00

(52) U.S. Cl. ............................. 463/20; 463/13; 463/16; 463/25; 273/143 R

(58) Field of Search .............................. 463/20, 13, 16, 463/25; 273/143 R; 74/386, 432, 433

(56) References Cited

U.S. PATENT DOCUMENTS

| | | | | | |
|---|---|---|---|---|---|
| 413,733 | A | * | 10/1889 | Richards | 474/171 |
| 450,484 | A | * | 4/1891 | Duval | 301/6.5 |
| 583,655 | A | * | 6/1897 | McCann | 74/432 |
| 819,708 | A | * | 5/1906 | Bannatyne | 368/322 |
| 1,064,047 | A | * | 6/1913 | Brandenburg | 74/432 |
| 1,067,700 | A | * | 7/1913 | Wessoleck | 74/432 |
| 1,143,558 | A | * | 6/1915 | Templeton | 74/432 |
| 1,357,719 | A | * | 11/1920 | Morgan | 74/433 |
| 1,494,255 | A | * | 5/1924 | Kobida | 74/15 |
| 1,567,263 | A | * | 12/1925 | Gossett | 74/432 |
| 3,166,949 | A | * | 1/1965 | Lapp | 74/433 |
| 3,318,169 | A | * | 5/1967 | Tronslien | 74/432 |
| 3,525,270 | A | * | 8/1970 | Queffeleant | 74/415 |
| 3,548,673 | A | * | 12/1970 | Suchocki | 74/409 |
| 3,655,302 | A | * | 4/1972 | Hermes et al. | 418/61.2 |
| 4,509,754 | A | | 4/1985 | Remmler et al. | |
| 4,693,477 | A | * | 9/1987 | Dickinson et al. | 273/143 R |
| 4,711,452 | A | * | 12/1987 | Dickinson et al. | 273/143 R |
| 5,135,224 | A | * | 8/1992 | Yamamoto et al. | 463/20 |
| 5,188,363 | A | * | 2/1993 | Marnell et al. | 463/13 |
| 5,553,851 | A | | 9/1996 | Malavazos et al. | |
| 5,609,524 | A | | 3/1997 | Inoue | |
| 5,656,901 | A | * | 8/1997 | Kurita | 318/436 |
| 5,683,296 | A | * | 11/1997 | Rasmussen | 463/20 |
| 5,752,881 | A | * | 5/1998 | Inoue | 463/20 |
| 5,839,957 | A | * | 11/1998 | Schneider et al. | 463/20 |
| 5,848,932 | A | * | 12/1998 | Adams | 463/20 |
| 5,851,148 | A | * | 12/1998 | Brune et al. | 463/25 |
| 5,951,398 | A | * | 9/1999 | Yamamoto et al. | 463/37 |

(List continued on next page.)

FOREIGN PATENT DOCUMENTS

JP Kokai 6-91034 A 4/1994

*Primary Examiner*—Benjamin H. Layno
*Assistant Examiner*—Dolores R. Collins
(74) *Attorney, Agent, or Firm*—Ryan A. Heck; Ian F. Burns & Assoc

(57) ABSTRACT

The specification discloses a multiple game-of-chance. The game occupies the same floor space as a traditional slot machine but has a spinning reel game mounted below a spinning wheel game. The game also an outcome bank for storing outcomes from the spinning wheel game. The spinning reel game may provide an outcome that activates the upper spinning wheel game, and the outcomes in the spinning wheel game can alter the outcome of the lower spinning reel game and also provide a bank of outcomes in the outcome bank, which can also be utilized to alter the outcome, or likely future outcomes, in the spinning reel game. The game also utilizes a flexible, resilient, Z-shaped radial drive gear to drive each of the three wheels in the upper wheel game independently.

20 Claims, 9 Drawing Sheets

U.S. PATENT DOCUMENTS

| | | | | | |
|---|---|---|---|---|---|
| 6,027,115 | A | * | 2/2000 | Griswold et al. | 273/143 R |
| 6,050,895 | A | * | 4/2000 | Luciano et al. | 463/7 |
| 6,059,658 | A | * | 5/2000 | Mangano et al. | 463/16 |
| 6,105,962 | A | * | 8/2000 | Malavazos et al. | 273/143 R |
| 6,129,632 | A | * | 10/2000 | Luciano | 463/12 |
| 6,135,884 | A | * | 10/2000 | Hedrick et al. | 463/20 |
| 6,224,483 | B1 | * | 5/2001 | Mayeroff | 463/20 |
| 6,234,897 | B1 | * | 5/2001 | Frohm et al. | 463/20 |
| 6,267,669 | B1 | * | 7/2001 | Luciano, Jr. et al. | 463/7 |
| 6,270,412 | B1 | | 8/2001 | Crawford et al. | |
| 6,302,790 | B1 | * | 10/2001 | Brossard | 463/20 |
| 6,334,814 | B1 | * | 1/2002 | Adams | 463/20 |
| 6,336,863 | B1 | * | 1/2002 | Baerlocher et al. | 463/27 |
| 6,368,216 | B1 | * | 4/2002 | Hedrick et al. | 463/20 |
| 6,439,995 | B1 | * | 8/2002 | Hughs-Baird et al. | 463/20 |
| 6,446,965 | B1 | * | 9/2002 | Boulton | 273/142 R |
| 6,450,884 | B1 | * | 9/2002 | Seelig et al. | 463/17 |
| 6,471,208 | B2 | * | 10/2002 | Yoseloff et al. | 273/143 R |
| 6,482,089 | B2 | * | 11/2002 | DeMar et al. | 463/20 |
| 6,491,584 | B2 | | 12/2002 | Graham et al. | |

* cited by examiner

FIG. 7
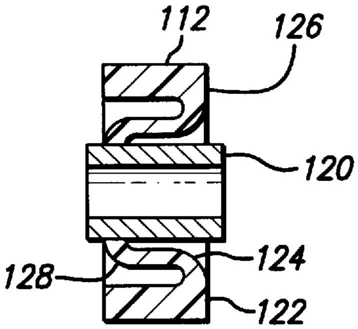
FIG. 9
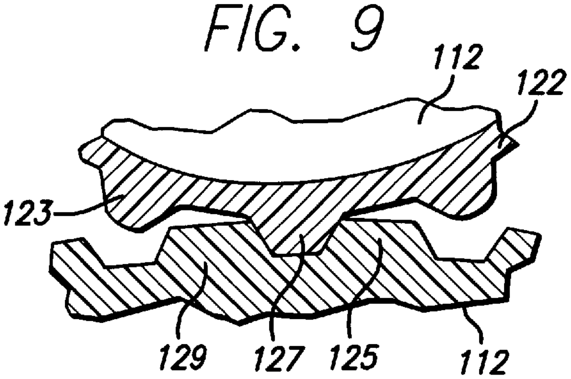
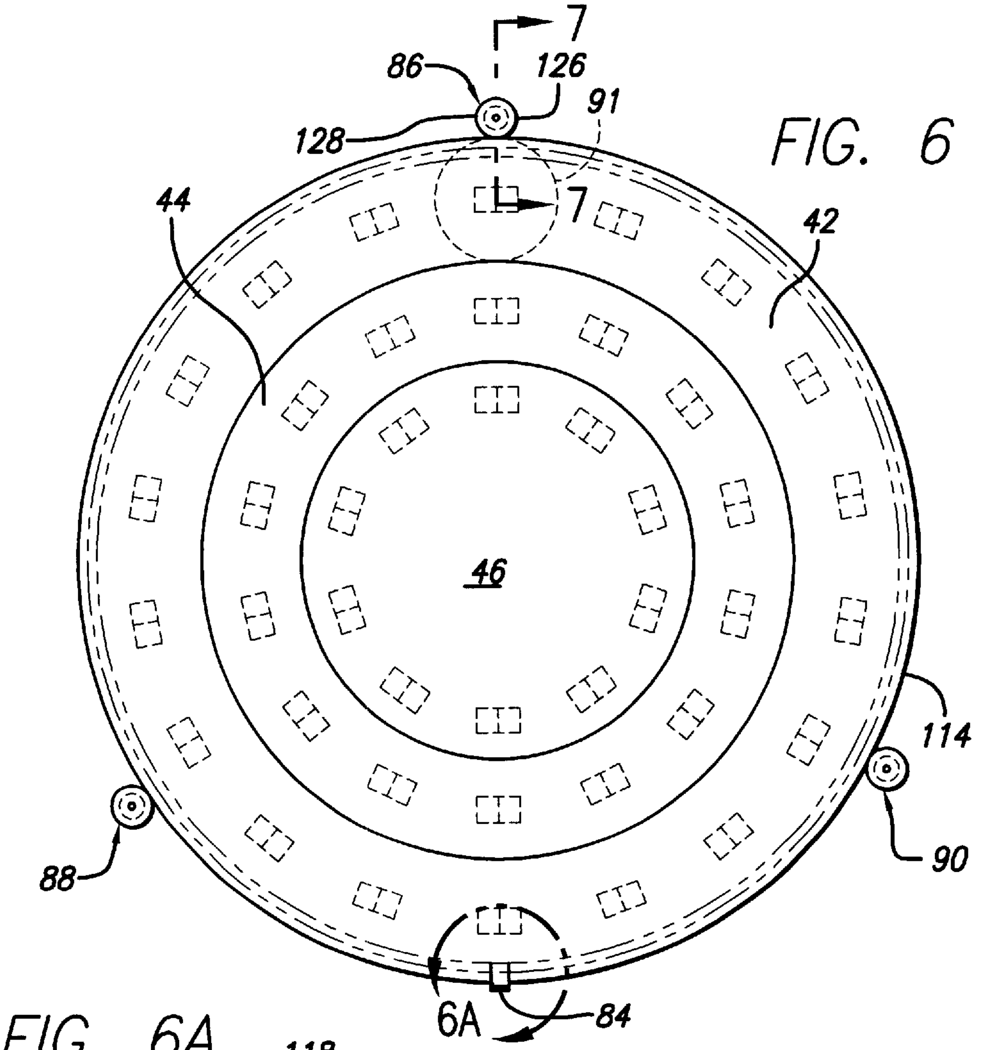
FIG. 6
FIG. 6A
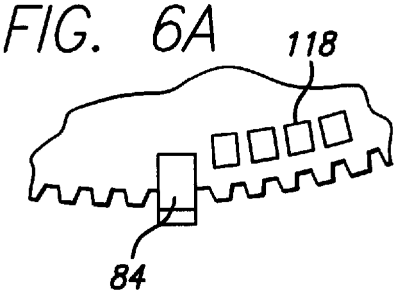
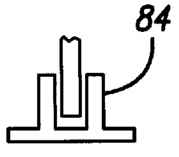
FIG. 6B

MULTIPLE GAME APPARATUS AND METHOD

CROSS REFERENCE TO RELATED APPLICATIONS

This is a divisional of application Ser. No. 09/527,705, filed on Mar. 17, 2000, which claims the benefit of U.S. provisional patent application No. 60/126,052, filed on Mar. 23, 1999.

FIELD OF THE INVENTION

This invention relates to a device and method for playing multiple games. More specifically, this invention relates to a device and method for playing at least two games of chance, the first of which provides the opportunity to (i) procure an outcome and a possible award based on the outcome and (ii) play the second game based on the outcome, and the second of which provides the opportunity to alter the present or future outcome on the first game of chance.

BACKGROUND

The gaming industry has long been trying to develop slot type games that are more exciting to play and thus more likely to be played and generate revenue.

For example, spinning reel wagering games are well known in the prior art and have long been a staple of the gaming industry. These games utilize one or more actual or apparent cylindrical reels that spin around an axis in response to the player's insertion of, or the player's activation of the game after insertion of, a coin or other method of payment to play the game. Game symbols are displayed on the outer circumference of the wheels. Typically, the game is won and a prize is awarded when the game symbols on the reels provide a particular predetermined outcome shown when the reels stop spinning. As a result, a three-wheel game might provide a large award to the player if the outcome is three apples in a row displayed by the three co-axial and adjacent wheels viewable to the player.

These spinning reel games can be made more exciting for the player, and thus more likely to be played, by addition of features such as flashing lights, sounds, double bonus time-periods, and progressive linking of multiple such games to a common jackpot in addition to the local jackpot for each machine on its own. These methods of making spinning reel games more exciting and thus more utilized are well known in the art. However, they still present the game player with only one basic game concept: the spinning reel game.

One way of making spinning reel or other slot type games (e.g., video poker) even more exciting and likely to be played is to offer an additional game that may be played in the event of a particular outcome in the underlying reel game. In one prior art gaming apparatus, such as that shown in UK Patent Application GB 2 201 821 A, a particular outcome or group of outcomes on the underlying spinning reel game allows the user to play a second but different type of game of chance mounted in the same machine or game box. The second game of chance is a spinning or roulette wheel type of game. In this fashion, the player may win a prize or award in the outcome underlying spinning reel game and then, due to that outcome, also procure the ability to play the second, different type of game and procure an additional prize or award based on the outcome of the second game.

In another somewhat similar prior art gaming apparatus, such as that shown in U.S. Pat. No. 5,823,874 (the '874 game), the second game of chance, which is also a spinning wheel type of game, is playable upon the occurrence of a particular outcome or group of outcomes in the underlying spinning reel game. In the '874 game, however, the outcome of the second game may directly alter the outcome of the first game and thus directly increase or decrease an award, or provide a different type of award than that provided, in the first game.

Although these types of prior art multiple game-of-chance apparatus can be more exciting than the traditional spinning reel device by itself and more exciting than other one-game slot machines such as game-card (e.g., video poker) machines, the applicant has discovered that much more can be done with multiple game-of-chance machines to make them much more exciting to play, more likely to be played, and more profitable for the game owner or gaming establishment. For example, in the device disclosed in the above-referenced British application, the second, roulette-wheel game has only one conventional roulette wheel and one set of or type of outcomes and awards provided by that one wheel game. In addition, the outcome of the first, base game does not affect the outcome or likely or possible future outcomes of the second game or vice versa.

Although the '874 patent teaches different types of awards in the second wheel game, including direct alteration of the outcome of the base reel game, the range of types of outcomes in the second wheel game is relatively narrow. In addition, the second wheel game does not provide an outcome that can allow for re-playing of the underlying first reel game. The second game also does not provide "appearance" outcomes that can be transferred directly to, for example, the underlying reel game or intermediate gaming apparatus to alter the positioning of the reels and the concomitant award to be provided based on the altered positioning of the reels in the first game. The '874 machine also offers no possibility for the outcome in the second game to allow the player to resume playing the underlying wheel game, nor does it offer the subsequent possibility for the underlying wheel game to yet again provide an outcome to once again play the reel game.

With regard to roulette or spinning wheel games in the prior art, they typically also have the wheels mounted at their axial center on axial drive shafts. Mounting and rotating the wheel on an axial drive places significant stress on the drive shaft and associated drive and support structure. Also, an axial mount and drive mechanism is typically noisy and easily damaged or moved off-center during use or installation or movement of the game apparatus. Axial mounting also occupies significant space for the axial drive behind the wheel, and it requires significant additional and complicated structure in order to drive multiple concentric wheels independently.

BRIEF SUMMARY OF THE INVENTION

The present invention apparatus includes at least two games of chance, and the first game of chance provides a first game outcome, including the possibility to activate the second of chance upon the occurrence of one or more predetermined outcomes in the first game of chance. Upon such activation of the second game of chance, the second game of chance can provide a second game outcome that can influence or alter the first game outcome (i.e. the pre-existing first game outcome or subsequent first game outcomes). Both games of chance are located to be viewable from the vicinity of one game player when located to play the first game of chance.

There are many other aspects of the invention that are apparent from this. For example, the two games may be and preferably are mounted in the same box; and the second game may provide multiple types of outcomes such as awards, potential contributions to an outcome bank or reserve for later utilization by the player in playing the first game, and direct alteration of the first game outcome. As another example, in the preferred embodiment, the first game is a spinning reel game, and the second game is a sequentially activated multi-wheel spinning wheel game.

In a particularly preferred embodiment, the apparatus utilizes a novel resilient drive gear as a radial drive for the wheels in the wheel game.

OBJECTS OR ADVANTAGES OF THE INVENTION

It is therefore an object of the present invention to provide a game-of-chance apparatus and method that is more exciting for the player and thus more likely to be played.

It is another object of the present invention to provide a "slot machine" type of game that is utilized more than prior art games and thus generates more revenue and profits for the game owner and gaming establishment.

Yet another object is to provide a "slot machine" type of game, thus allowing the game to be played at any time by one player and without any help from any other player or operator.

An advantage of the present invention is that it provides a multiple game-of-chance that utilizes traditional base games, such as spinning reel or automated card games, and also provides a second game-of-chance that can directly alter the game appearance outcome or possible future game appearance outcome(s) in the base game.

A further advantage is the present invention provides a wagering game-of-chance apparatus having a spinning wheel or other traditional slot machine type of game and a second wheel game-of-chance, with the wheel game having multiple wheels providing multiple outcomes and, preferably, multiple types of outcomes.

A still further advantage is that the invention provides such a game in which the multiple wheels are concentric and preferably rotate or stop rotation in sequence.

An additional advantage is that the present game apparatus also provides a bank or stored reserve of outcomes or partial outcomes that the game or possibly the player may draw upon to alter or improve the appearance and award outcomes in the first or second game.

Another advantage is that, in the present game machine, the second game can add to or alter the contents of the bank, possibly at the game player's option.

Yet another advantage is that the present invention provides a game machine in which the second game is a multi-wheeled game and one wheel provides outcomes that add to or alter the contents of the bank, preferably for altering or improving the outcome for the player in the first game.

A still further advantage of the present invention is that the second game provides the opportunity for re-activation of the first game, and also that the first game may then again provide the opportunity to re-activate the second game. This cycle can continue theoretically for as long as the player desires to continue playing the game.

A further advantage is that the invention provides a multi-wheeled or roulette game that is quieter and more durable and long lasting than prior multi-wheeled games. A related advantage is providing such a game with a more precise yet relatively simple drive mechanism for driving independent rotation of the wheels. A still further related advantage is providing such multi-wheeled game with resilient and reliable radial drive gears. Another advantage is providing a multi-wheeled game in which the wheel drive need not occupy as much space as conventional axial drive wheel games.

A further advantage of the present invention is that it provides a multi-game apparatus and method in which the multiple games can all be viewed by the player without moving from place to place and, preferably, are all mounted together in a manner that occupies approximately the same floor space as a traditional, single game slot machine.

A yet additional advantage is that the present multi-game machine may have one game mounted directly above the other, with the lower game appearing much like a traditional spinning reel or other slot machine, the upper game being a multi-wheeled spinning reel game, and optionally an outcome reserve mounted in or on the first and/or second game.

There are other objects and advantages of the present invention. They will become apparent as the specification proceeds.

In this regard, it is to be understood that the scope of the present invention is to be determined by reference to the accompanying claims, and not necessarily by whether any given embodiment achieves all of the objects or advantages stated herein.

BRIEF DESCRIPTION OF THE DRAWINGS

The preferred embodiment of the present invention is described in the following section by reference to the accompanying drawings, in which:

FIG. 6 is a front plan view of the drive mechanism apparatus of the upper concentric multi-wheel game;

FIG. 6A is a partially exploded front plan view showing the optic encoding pattern on the outer periphery of the outer concentric wheel in the upper concentric multi-wheel game;

FIG. 6B is cross-sectional view of the optic sensor mounted adjacent the outer periphery of the outer concentric wheel in the upper concentric multi-wheel game;

FIG. 7 is a cross-sectional side view of the resilient radial drive gear of the uppermost drive mechanism of FIG. 6, taken along section line 7—7 of FIG. 6.

FIG. 9 is substantially a front plan view of a resilient gear mechanism according to the present invention.

DETAILED DESCRIPTION OF THE PREFERRED EMBODIMENT

Figure 1:
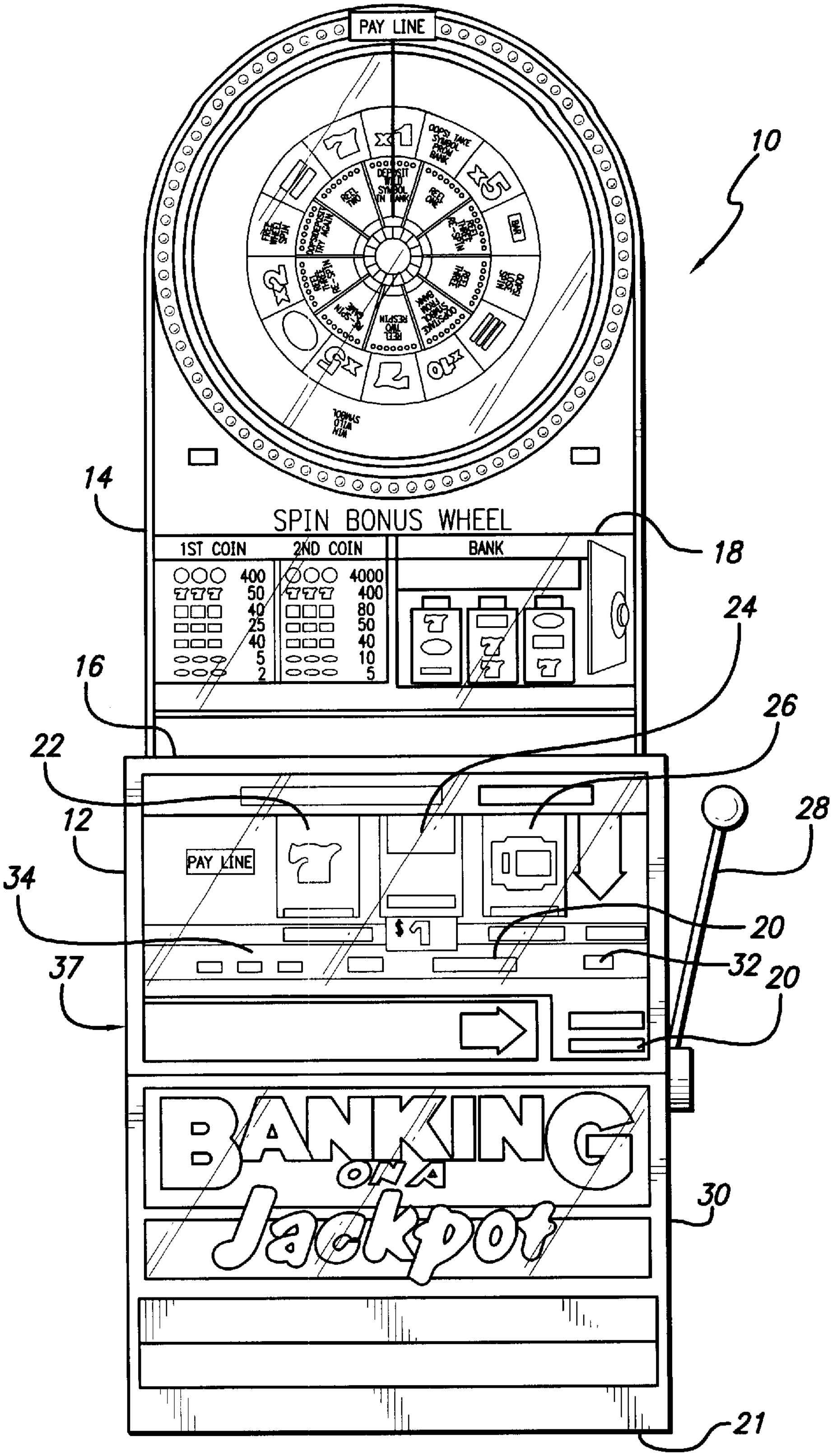
FIG. 1 is a front plan view of the applicant's multi-game apparatus having a lower reel spinning game, an upper concentric multi-wheel game, and an outcome bank of possible reel outcomes that may be drawn upon by the game player.

Referring now to FIG. 1, the preferred embodiment, generally 10, has two wagering games-of-chance 12, 14. The first game-of-chance 12 is a spinning reel game, and the second game-of-chance 12 is a spinning wheel game. The spinning reel game 12 and spinning wheel game 14 are mounted in the same game box 16, with the spinning wheel game mounted in the game box 16 vertically above the spinning reel game 12. A spinning reel outcome bank 18 is mounted between the spinning reel game 12 and the spinning wheel game 14.

The base or footprint 21 of the game box 16 occupies the same floor space (not shown) as would be occupied by a traditional single game slot machine (not shown). As a result, this multiple game apparatus 10 may be utilized in place of the traditional slot machine (not shown) without occupying additional floor space (not shown) in the gaming establishment (not shown).

The spinning reel game 12 operates much like a traditional spinning reel game (not shown) with the exception that it interacts with the outcome bank 18 and the spinning wheel game 14 as described in this specification. Thus, the reel game 12 has payment or money-in slots, generally 20, adjacent the three co-axially aligned reels 22, 24, 26 viewable by an operator or player of the game (not shown) who typically would stand or sit immediately in front of the reel game 12 to play the reel game 12. A reel activation arm 28 extends upwardly from the right side 30 of the reel game 12 as viewed by an operator or game player (not shown). The arm 28 is rotatably mounted in the right side 30 in a fashion well known in the art.

The reel game 12 also has a reel game activation or 'spin' button 32 and various reel game controls and indicators, generally 34, well known in the art. Among the indicators is a credit meter 36, which indicates the amount of money available for playing the game 10. A coin pay-out bin 38 is located below the level of the game controls 37 and game display indicators 34, which are generally located below the spinning reels 22, 24, 26.

Figure 2:
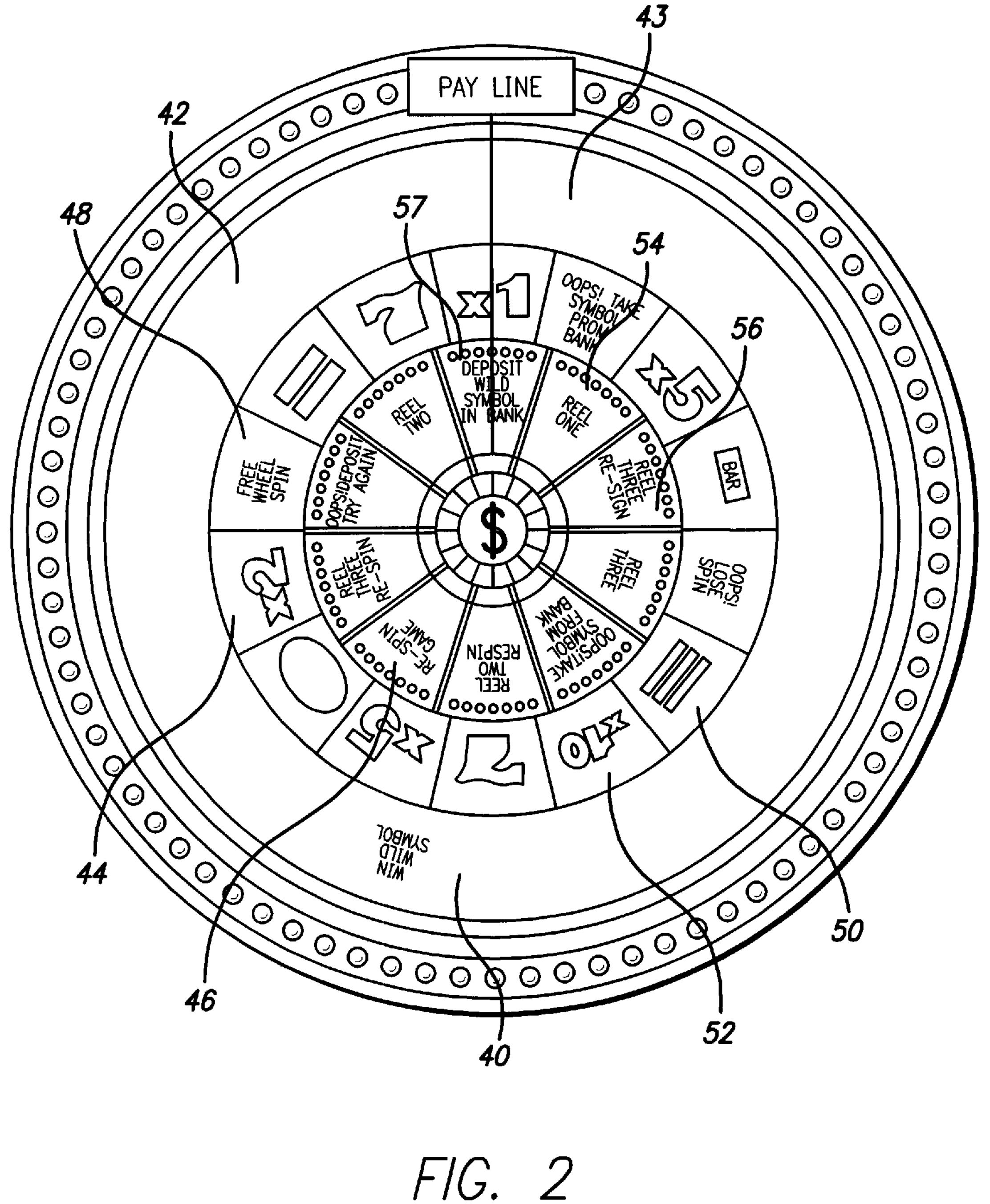
FIG. 2 is a front plan view of the upper concentric multi-wheel game shown in FIG. 1.

Referring now to FIGS. 1 and 2, the wheel game 14 has three concentric wheels 42, 44, 46. The outermost concentric wheel 42 has a single "Wild Symbol" indicia 40. The middle concentric wheel 44 has three types of indicia: (1) free wheel spin indicia 48; (2) bank reel outcome indicia, e.g., 50, and (3) award multiplier indicia, e.g., 52. The inner concentric wheel 46 has (1) bank reel changing indicia, e.g., 54, and (2) wheel re-spin indicia, e.g., 56. The three concentric wheels 42, 44, 46 spin in sequence, with the outer concentric wheel 42 spinning first, the middle wheel 44 spinning when the outer wheel 42 ceases spinning, and the inner wheel 46 spinning until the middle wheel 44 spins to a stop.

Figure 3:
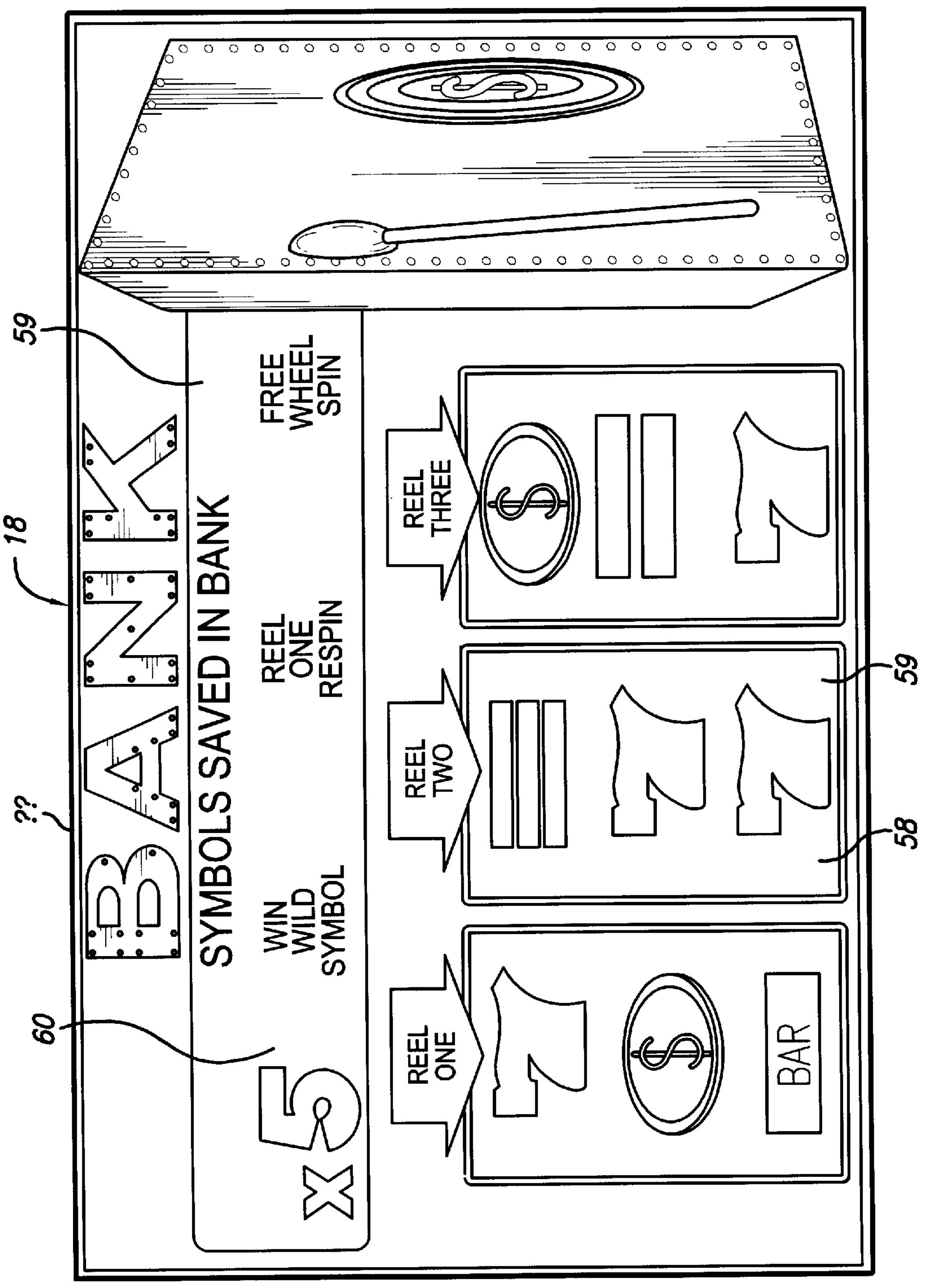
FIG. 3 is a front plan view of the outcome bank shown in the game of FIG. 1.
Figure 4:
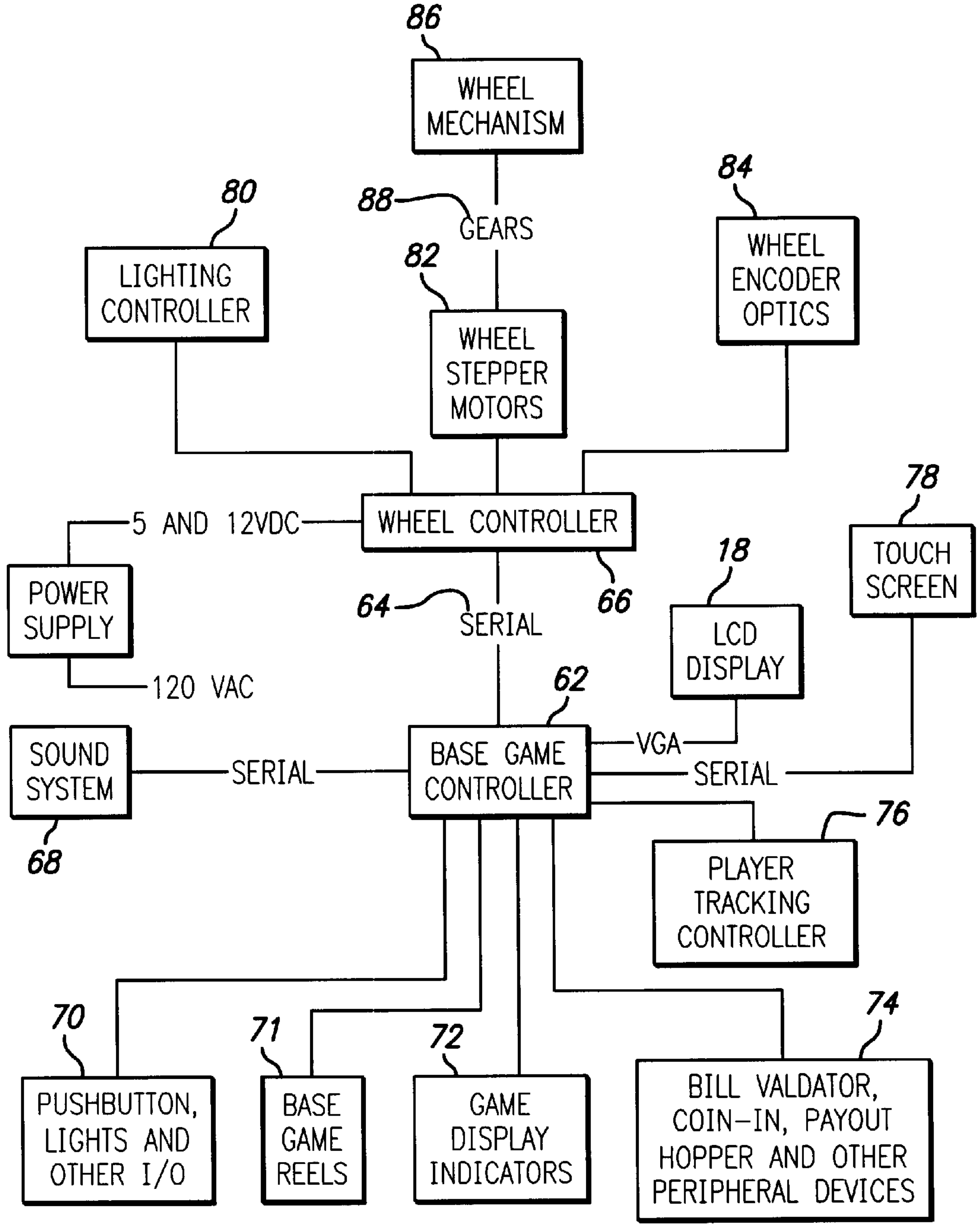
FIG. 4 is a schematic view showing the connections and relationships between the internal operating components of the preferred multi-game apparatus.

Referring now to FIG. 3, the outcome bank 18 consists of, as shown in FIG. 4, an LCD display 18 and, referring back to FIG. 3, depicts an upper symbol bank display 18 directly above a wheel game replicating display, generally 58. The wheel game replicating display 58 replicates the spinning action and outcomes reflected in, as shown in FIG. 1, the first game spinning reels 22, 24, 26. Referring to FIG. 3, the upper symbol bank display 18 displays up to a maximum of four indicia, generally 60, identical to, as shown in FIG. 2, the various types of middle wheel 44 indicia 48, 50, 52 placed and displayed in the outcome bank 18 as a result of outcomes procured when spinning the middle wheel 44 in the spinning wheel game 14 shown in FIG. 1.

Referring now to FIGS. 4 and 1, a base game controller 62 provides for automated control and operation of the reel game 12. The base game controller 62 also communicates via serial interface 64 with the wheel game controller 66, which provides automated control and operation of the wheel game 14. In this fashion, the base game controller 62 then provides for automated control and operation of the outcome bank or LCD display 18 and interaction of the outcome bank 18 with the reel game 12.

The base game controller 62 is connected to and controls the sound system 68, other conventional input/output apparatus 70, the reel game 71, the reel game display 72, the coin-in, payout, and peripheral device apparatus 74, and player tracking controller 76 in a fashion well known by those skilled in the art. The base game controller 62 may also be connected to, and control the operation o, a touch screen display 78. The touch screen display 78 may operate in conjunction with, for example, the LCD 18 display to allow the game player (not shown) to select among various outcome banking options that can be shown in the LCD display 18. This type of additional feature and touch screen 78 is not included, however, in the preferred embodiment of FIG. 1.

The wheel game controller 66 is connected to and controls the lighting controller 80, the wheel stepper motors 82, and wheel encoder optics 84. In turn, the wheel stepper motor activates and controls the rotation of the concentric wheel mechanism 86 by means of radial gears 88 shown in detail in FIGS. 5–7. The details of the interconnections and means of accomplishing control between the wheel controller 66, lighting controller 80, wheel stepper motors 82, and wheel encoder optics 84 are not further described since they are known to those skilled in the art.

Figure 5:
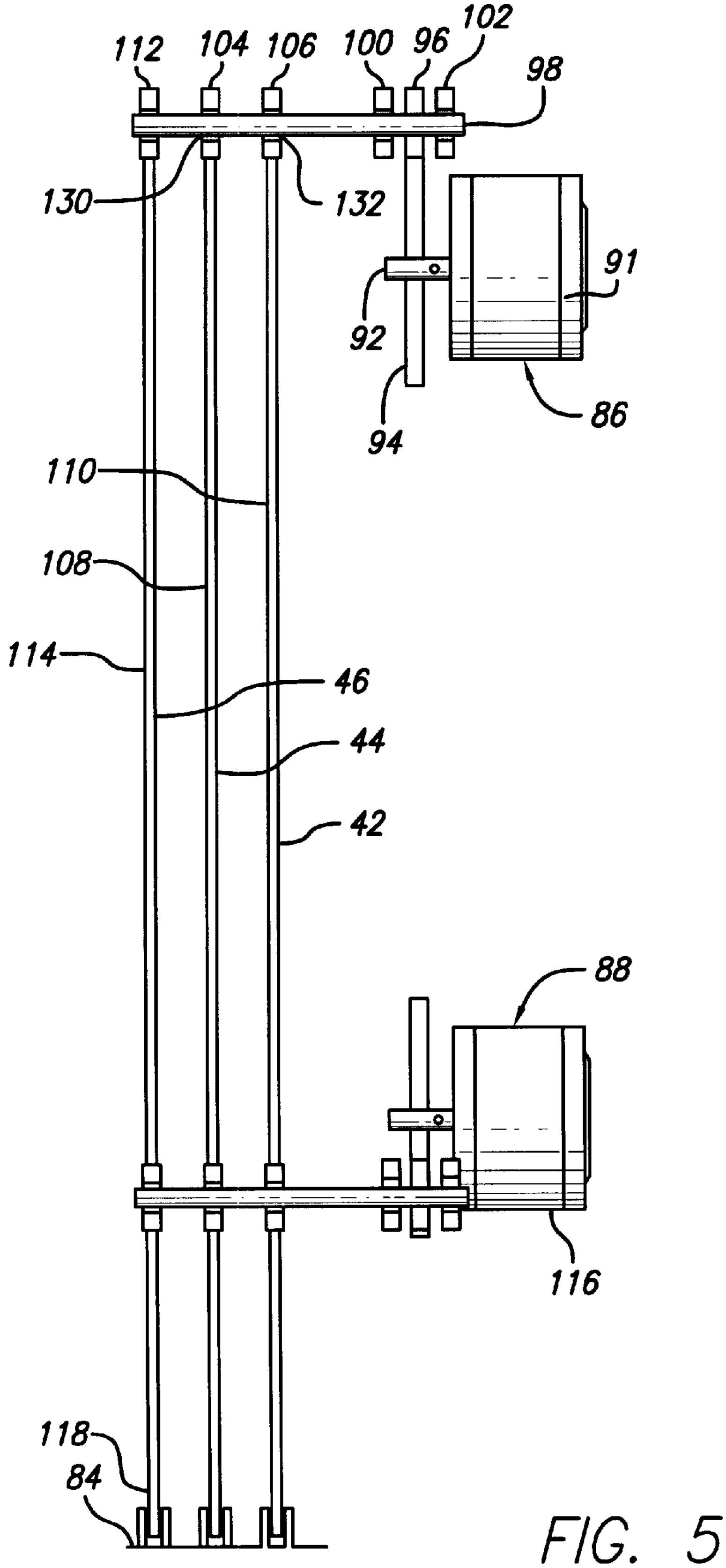
FIG. 5 is a side plan view of the drive mechanism apparatus of the upper concentric multi-wheel game.

Referring now to FIG. 5, the three concentric wheels are secured in place, driven, and controlled within game box 16 (not shown in FIG. 5) by three radial drive mechanisms, generally 86, 88, 90 (see 90 in FIG. 6). Each radial drive mechanism, e.g., 86, consists of (i) a stepper motor 86 rigidly mounted to the interior of the box 16 (not shown in FIG. 5); (ii) a stepper motor drive shaft 92 extending from and driven by the stepper motor 86; (iii) a drive gear 94 radially extending from and driven by the motor drive shaft 92; (iv) a shaft gear 96 meshing with and driven by the drive gear 94 and radially extending from and rigidly secured to an offset drive shaft 98; (v) two offset drive shaft support bearings 100, 102 mounted to the interior of the box 16 to hold the offset drive shaft 98 in position with respect to the drive gear 94 and the concentric wheels 42, 44, 46; (vi) two free spinning, resilient radial gears 104, 106 extending radially from the offset drive shaft 98 and engaging mating gear teeth in the outer periphery 108, 110 of the mating concentric wheels 42, 44 engaged and supported in position by the radial gears 104, 106, and (vii) a driven resilient radial gear 112 extending radially from, and driven by, the offset drive shaft 98 and thus engaging and driving mating gear teeth in the outer periphery 114 of the mating inner concentric wheel 46 engaged, driven, and supported in position by the driven radial gear 112. Consequently, the stepper motor 86 controls and drives the rotation of the inner concentric wheel 46.

Referring now to both FIGS. 5, 6, 6A, and 6B by altering the location of the driven radial gear, e.g., 112, with respect to the two free spinning radial gears, e.g., 104, 106, in the other two drive mechanisms 88, 90, the second stepper motor 116 in the second drive mechanism 88 controls and drives the rotation of the middle concentric wheel 44, and the third stepper motor (not shown) in the third drive mechanism 90 controls and drives the rotation of the outer concentric wheel 42. The wheel encoder optic sensor 84 is mounted in the box 16 (not shown in FIG. 5 or 6) adjacent the outermost periphery of the three co-axial concentric wheels 42, 44, 46 in order to read the rotational position of each such wheel, e.g., 42, by reading an optic encoding pattern 118 in the outer periphery of the wheel 42. The structure and operation of the optic sensor array 84 and mating encoding patterns, e.g., 118, in the outer periphery of all three wheels 42, 44, 46 are known to those skilled in the art and thus not further described herein.

Referring now to FIG. 7, each driven resilient drive gear, e.g., 112, is made of flexible urethane. The resilient gear 112 has a central axial tubular section 120 that is bonded to the outer periphery of, as shown in FIG. 5, the offset drive shaft 98 on which the resilient gear 112 is mounted. The resilient gear 112 is thus driven to rotate along with the rotation of the offset drive shaft 98.

The gear teeth member 122 of the resilient gear 112 is integral with, and extends radially outwardly from, the central tubular section 120. In the cross-sectional view of FIG. 7, the gear teeth member 122 has an integral Z-shaped, radially compressible and resilient cross-section, with one arcuate or U-shaped resilient arm section 124 (which is within or integral to the overall Z-shaped portion 122) narrowed with respect to the other, thickened resilient arm 126 of the U-shaped portion 124. The outermost end 128 of the narrowed arm 124 extends radially outwardly from the tubular section 120, and the thickened arm 126 has, as shown in FIG. 6, integral gear teeth, 128 generally, extending radially outwardly from the circumferential periphery of the thickened arm 126.

Referring now to FIG. 9, the gear teeth member or pinion 122 has rounded (i.e., circular) gear teeth 123 extending radially outwardly to mate with angled gear teeth 125 on the mating radial gear, e.g., 112. Upon intersection of a rounded gear teeth member, e.g., 127, in the corresponding spacing between two adjacent angled gear teeth, e.g., 125, 129, the resilient rounded gear teeth member 127 is deformed to fill the entire space between the angled gear teeth 125, 129. This high level of engagement between the radial gear 112 and gear teeth member 122 ensures secure driving of the gear teeth member 112 by the radial gear 112, while minimizing any backlash between the gear teeth member 122 and radial gear 112.

Referring now to both FIGS. 6 and 7, the flexible urethane composition and the U-shaped cross-section of the resilient gear 112 also allows the resilient gear 112 to accommodate and resiliently damp vibration of or shock to, and absorb lateral movement and expansion or contraction of, the concentric wheel 42 while continuing to drive or stop rotation of the concentric wheel 42 in response to corresponding rotation or termination of rotation by the corresponding stepping motor 91. In addition, the driving engagement of the resilient gear 112 with the mating peripheral teeth in the periphery 114 of the concentric wheel 42 is relatively quiet and noise-free. The radial drive of the concentric wheel 42 provided by the resilient gear 112 and its associated zero-backlash drive mechanism 86 is not only generally more precise than conventional axial or wheel drive mechanisms but also typically less likely to be damaged or mis-aligned during use or movement of the game 10 shown in FIG. 1.

Referring to FIG. 6, the urethane composition of the lower resilient gears 88, 90 is stronger than that of the upper resilient gear 86. Specifically, the composition of the lower resilient gears 88, 90 is 80 Shore A Durometer polyester based urethane ("Versathane"); and that of the upper gear 86 is 86 Shore A Durometer Versathane.

Referring now to FIG. 5, the structure of the free-spinning gears 104, 106 is the same as the structure of the driven gear 112 except that the free-spinning gears are mounted on internal bearings 130, 132. The bearings 130, 132 freely rotate with respect to the offset drive shaft 98 and thus allow the gears 104, 106 to similarly rotate.

Figures 1, 8:
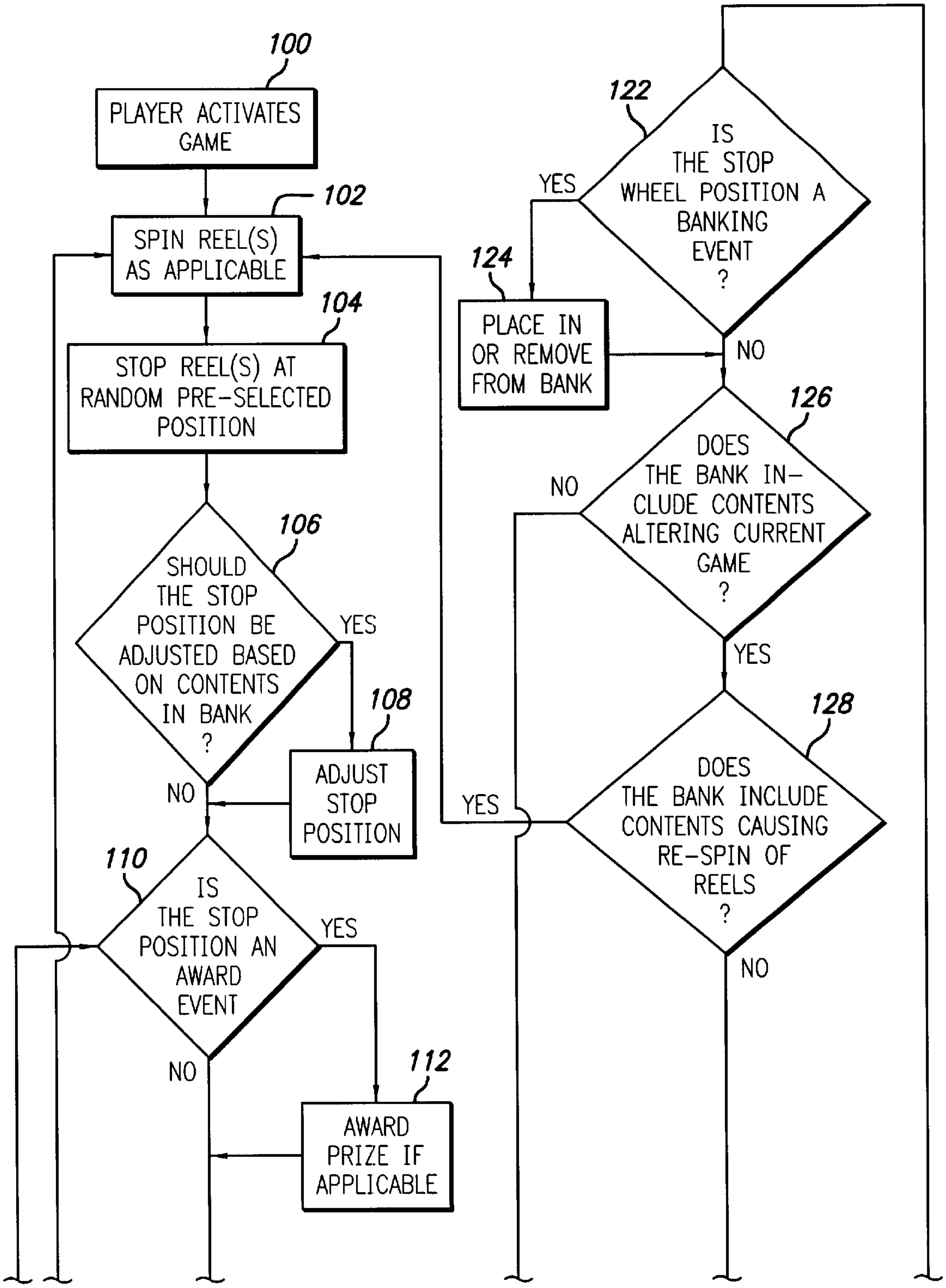
FIG. 8 is a flow chart of the preferred method of playing the preferred multi-wheel game.
Figures 2, 8:
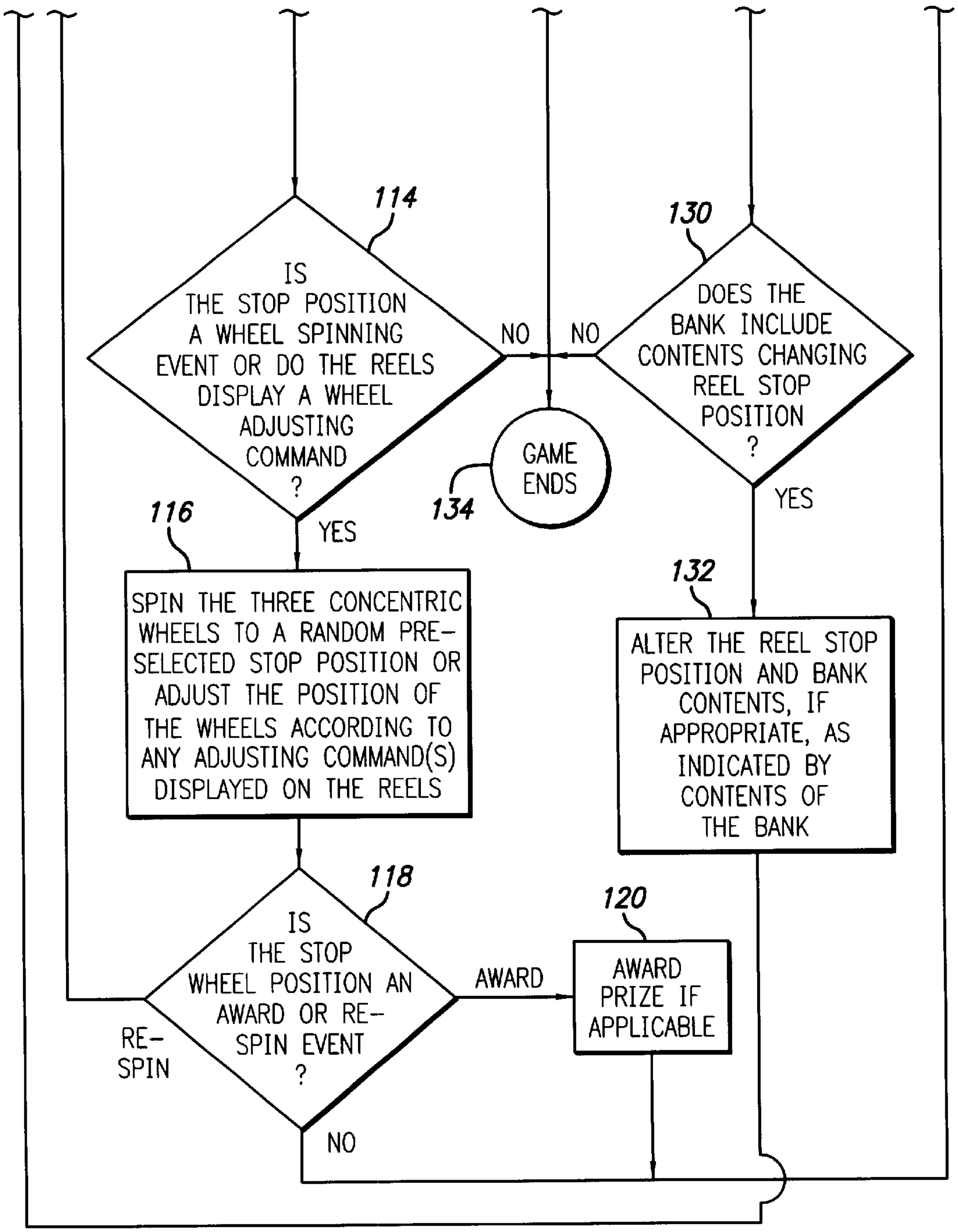

With reference now to FIGS. 1 and 8, the preferred game is played as follows.

1. The player activates the game 10 by inserting two coins (or electing two credits) and pulls the handle 28 or pushes the 'spin' button 32 on the reel game 12.
2. The reels 22, 24, 26 spin 102 to a stopping position 104 that is randomly generated by a random number generator incorporated into the reel game 12 in a fashion well known to those skilled in the art.
3. If the stop position is an award event 110, the player is credited with the award by the game 112 in a manner well known in the art.
4. If one of the reels 22, 24, 26 in the stop position does not display a "spin wheels" symbol 114, the game ends 134.
5. If one of the reels 22, 24, 26 in the stop position 110 displays a "spin wheels" symbol 114, the wheel game 14 is activated 116 and the three concentric wheels 42, 44, 46 spin and stop at a stopping position 116 in sequence, with the outer wheel 42 stopping first, the middle wheel 44 stopping second, and the inner wheel 46 stopping last. The resulting stopping position 116 is also randomly generated by a random number generator incorporated into the wheel game 14 in a fashion well known to those skilled in the art. In an alternative embodiment, wheels 42, 44, and 46 are not spun to randomly determined stopping positions. Rather, the position of the wheels 42, 44, and 46 are adjusted based on incremental adjusting commands displayed on reels 22, 24, and 26. For example, reel 22 may display a symbol that requires wheel 42 to be rotated one position, in which case wheel 42 is advanced one position. The wheel adjusting commands may require any or all of wheels 42, 44, and 46 to be moved any number of positions in either direction. Because the stopping position of wheel 42, 44, and 46 are dependent on the staring position of the wheels and the outcome of reels 22, 24, and 26, game 14 can be viewed as an extension of game 12 rather than an independent bonus game. In this embodiment, wheels 42, 44, and 46 may be moved to randomly determined starting positions when game apparatus 10 is first turned on.

The present invention includes yet another embodiment in which outcome of reels 22, 24, and 26 and wheels 42, 44, and 46 are determined by a single random selection process. In this embodiment, a single random number may be generated that is compared to a game outcome table. The game outcome table includes all of the possible outcomes and displays that may be presented by game apparatus 10, including respins of the reels and wheels and wheel adjusting commands. While it may appear to the player that games 12 and 14 are operating independently from one another, in fact, a single random event may determine the entire game.

6. The outcome of the wheel game 14 may provide an award event 120 and an award and a bank-storage event 122, 124. More specifically and with continuing reference throughout to FIG. 8, the outcome of the wheel game 14 is determined as follows:
   A. As shown in FIG. 2, the outer wheel 42 stops at either a number symbol, e.g., 43, or a "Win wild" symbol 40. If the outer wheel 42 stops at number symbol 43, the player is credited with a number of coins equivalent to the number stated by the number symbol 43, 120.
   B. If the outer wheel 42 stops at the "Win wild" symbol 40, the "Win wild" symbol 40 is placed, as shown in FIG. 3, in the upper horizontal symbol bank display 59 in the symbol bank 18, replacing a pre-existing symbol according to a first-in-first-out ("FIFO") replacement method 124. When this occurs, one of the symbols in the spinning reel game 12 is replaced with a wild symbol at the conclusion of each of the next four games played by the game player 126, 130, 132, 106. The replacement takes place by automatically selecting and spinning one of the three reels 22, 24, 26 (shown in FIG. 1) to display the wild symbol on the one reel 108, to thus provide the best possible outcome by the single replacement on the one of the three reels 22, 24, 26. If this replacement yields a winning outcome 110 on the reels 22, 24, 26, the player is awarded the award 112 according to the winning outcome on the reels 22, 24, 26.

C. Referring back to FIG. 2, when the middle wheel 44 stops at an award multiplier, e.g., 52, and the player has been awarded an award by the stop position of the outer wheel 42, that award is multiplied by the amount of the multiplier and credited to the player 118, 120. The multiplier 52 is also stored in, as shown in FIG. 3, upper horizontal bank display 59 (thus replacing a pre-existing symbol in the bank display 59 according to the FIFO method 122, 124. When this occurs, the multiplier 50 is automatically applied in, as shown in FIG. 1, the lower reel game 12 to multiply the award, if any, to the player in each of the next four plays of the lower reel game 12, 110, 112.

D. Referring back to FIG. 2, if, instead of an award multiplier, e.g., 52, the middle wheel 44 stops on a bank reel symbol, e.g., 50, then that symbol is transferred to and appears in, as shown in FIG. 3, the bank reel display 58, 122, 124 only if, as shown in FIG. 2, the inner wheel 46 stops or lands on a bank reel changing indicia, e.g., 54. In such an event, the particular bank reel symbol, e.g., 50, 132, is added to the particular reel area, in the bank reel display 58, identified by the bank reel changing indicia, e.g., 54. Once a symbol resides in the bank reel display 58, the symbol is automatically applied to, as shown in FIG. 1, the lower reel game 12 if the application of that symbol will result in an award to the player 126, 130, 132. For example, if, as shown in FIG. 3, the symbol "7" appears in the second bank reel 59 and the combination "7, blank, 7" appears in, as shown FIG. 1, the stop position of the lower reel game 12, the middle reel 24 rotates to indicate a "7" in the stop position and thus provide an award to the player in conformance with the appearance of "7, 7, 7" in the stop position of the lower reel game 12.

E. Referring back to FIG. 2, if the middle wheel 44 stops at the "Oops, take symbol from bank" symbol and the inner wheel 46 stops at bank reel symbol, e.g., 50, then a symbol is removed from, as shown in FIG. 3, the particular reel area, in the bank reel display 58, identified by the bank reel symbol, e.g., 50, according to the FIFO rule 122, 124, 132.

G. Referring back to FIG. 2, if the middle wheel stops at the symbol "Oops loose spin," that symbol is deposited in, i.e., appears in, the horizontal bank display 59, 122, 124 as shown in FIG. 3. When this happens, the upper wheel game 14 as shown in FIG. 1 will not be activated, and the wheels 42, 44, 46 as shown in FIG. 2 will not spin, even if a "spin wheels" symbol occurs in, as shown in FIG. 1, the lower reel game 12 in any of the four succeeding games or reel spins that take place 106, 108. At the same time, however, other symbols may be taken from the bank 18 during this time period as explained above.

H. Referring again to FIG. 2, if the middle wheel 44 stops at the symbol "Free wheel spin," it is deposited in the upper horizontal bank display 59 and is active for the next four games played by the player 106, 108. In other words, regardless of reel outcome in, as shown in FIG. 1, the lower reel game 12 in each of the next four such games, the upper wheel game 14 is activated when the reel game 12 ceases spinning in each such game.

I. Referring now to FIG. 2, if the inner wheel 46 stops at the symbol "Deposit wild symbol in bank," then a wild symbol is deposited 122, 124 randomly as a next available symbol on one of the bank reel areas in the bank reel display 58 as shown in FIG. 3. In the next play of the lower reel game 12 by the game player as shown in FIG. 1 in which the wild symbol can provide an award for the player when transferred to the same reel, the wild symbol is transferred to the lower game reel 106, 108 and the player is awarded the prize or credit 112 provided by the outcome on the lower reel game 12 as altered by the transfer.

J. Referring now to FIG. 2, if the inner wheel 46 lands on the symbol "Oops no deposit," then nothing happens and the game terminates unless otherwise extended by the stop position of the outer 42 or middle 44 wheels.

K. If the inner wheel 46 lands on the symbols "Reel 'X' re-spin" or "Re-spin game" 108, then the designated reel(s) in the lower game 12 as shown in FIG. 1 is (are) respun 102 and the outcome of the re-spin may provide yet another award 112 or reactivation of the wheel spinning game 14, 116.

L. Referring yet again to FIG. 2, if the inner wheel 46 lands on the symbol "Oops, take symbol from bank" 122, a randomly selected symbol is removed from the reel display 58 in the bank 18, 124.

Figure 10:
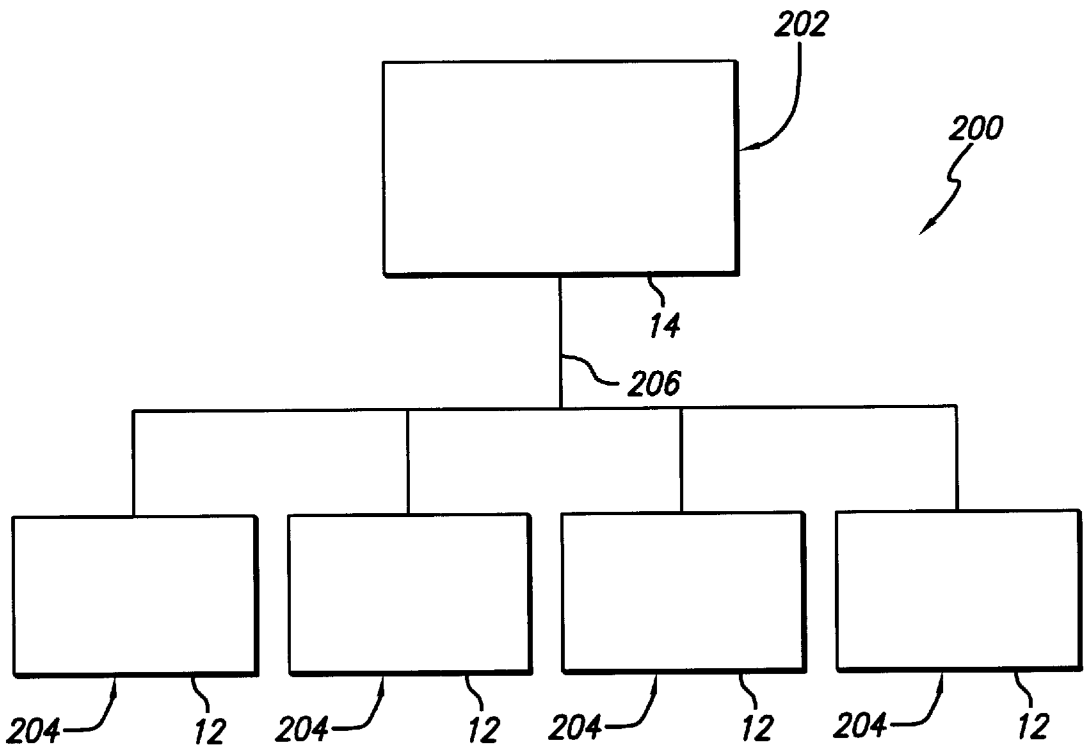
FIG. 10 is substantially a schematic diagram of a networked system of the present invention.

FIG. 10 illustrates a networked system 200 of the present invention in which a single separate display unit 202 containing spinning wheel game 14 may be linked to one or more game devices 204. Game devices 204 may contain any of a large variety of games and game displays. In the preferred embodiment, game devices 204 comprise spinning reel games 12. Each game device 204 is linked to display unit 202 by a communication device 206. Communication device 206 may use many different communication protocols and systems, such as Ethernet communication protocols, network cards, and cables.

In this embodiment, adjustments may be made to the method of the present invention to allow a plurality of game devices 204 to use a single display unit 202. When one of the game devices 204 produces a wheel spinning event (see FIG. 8, step 114), a signal is transmitted to display unit 202. If display unit 202 is currently working to generate a display for another wheel spinning event, the signal or information in the signal may be placed in a queue or memory device. When display unit 204 is free to respond to a new wheel spinning event, the signal is received, processed, and display unit 204 spins the wheels (see FIG. 8, step 116). The method would then continue as previously discussed.

In order to avoid confusion among players, system 200 may comprise a means for indicating which game device 204 is currently interacting with display unit 202. The indicating means may comprise a video display or lighted sign on display unit 202 that displays indicia, such as a number, that indicates the currently interacting game device 204. A display, such as a video display or lighted sign, may also be placed on game device 204 for conveying similar information to the player. For example, when the player has qualified to spin the wheel of display unit 202 but the display unit is working on an event for anther player, the display may communicate this to the player. When it is the player's turn, the display so informs the player.

System 200 may be adapted for use with progressive jackpots. Display unit 202 may include a progressive jackpot meter that displays the current value of the jackpot in a way that is well known in the art. Players may win the progressive jackpot as a result of obtaining a predefined outcome on display unit 202, game device 204, or a combination of both.

It is to be understood that the foregoing is a detailed description of the preferred embodiments and certain variations therefrom. The scope of the applicant's invention, however, is to be determined by reference to the following claims.

What is claimed is:

1. A wheel game of chance apparatus of the type providing an award to a player playing the wheel game of chance apparatus, the apparatus comprising in combination:

A. at least a first game wheel having drive teeth in the periphery of the first game wheel;

B. a wheel drive mounted in the apparatus and having a resilient gear with resilient compressible gear teeth matingly engaging the drive teeth in the first game wheel;

whereby the game wheel is secured and rotated within the wheel game of chance apparatus.

2. The wheel game of chance apparatus of claim 1 wherein the wheel drive also has a drive shaft and the resilient compressible gear has a central shaft tube mounted on the drive shaft, a stiffened outer wheel section with the gear teeth on the outer circumferential periphery of the outer wheel section, and a flexible intermediate section between the shaft tube and the outer wheel section.

3. The wheel game of chance apparatus of claim 2 wherein the flexible intermediate section and stiffened outer wheel section of the resilient compressible gear are integral and cooperatively provide an arcurate cross-section with an outer arm comprising the outer wheel section and an inner arm connected to the central shaft tube of the resilient gear.

4. A wheel game of chance apparatus of the type providing an award to a player playing the wheel game of chance apparatus, the apparatus comprising in combination:

A. at least a first game wheel coaxial with a second game wheel, each said game wheel having drive teeth in the circumferential periphery of said game wheel;

B. at least three wheel drives mounted in the wheel game of chance apparatus, each said wheel drive having a resilient driven gear with resilient deflectable gear teeth matingly engaging the drive teeth in a corresponding one of the three game wheels to secure and controllably drive the rotation of the corresponding one game wheel within the wheel game of chance apparatus.

5. The wheel game of chance apparatus of claim 4 wherein each wheel drive also has a drive shaft and each resilient driven gear for each such wheel drive has a central shaft tube mounted on said drive shaft, a thickened outer wheel section with the gear teeth on the outer circumferential periphery of the outer wheel section of said resilient driven gear, and a flexible, thinner intermediate section between the shaft tube and the outer wheel section of said resilient driven gear.

6. The wheel game of chance apparatus of claim 5 wherein the flexible intermediate section and thickened outer wheel section of each such resilient driven gear cooperatively provide an arcuate cross-section with an outer arm comprising the outer wheel section and an inner arm connected to the central shaft tube of such resilient driven gear.

7. The wheel game of chance apparatus of claim 6 wherein the gear teeth are rounded, each said wheel drive provides resilient support for each said game wheel, and the first wheel drive controllably rotates the first game wheel and the second wheel drive controllably rotates the second game wheel.

8. The wheel game of chance apparatus of claim 1 wherein the reilient compressible gear comprises a thickened gear teeth section, a thickened central section, and a thinner intermediate section connecting the thickened gear teeth section to the thickened central section, the thickened gear teeth section having the gear teeth extending radially outwardly from the gear teeth section.

9. The wheel game of chance apparatus of claim 8 wherein the thickened gear teeth section, the thinner intermediate section, and the thickened central section cooperatively provide a U-shaped cross-section in the resilient drive gear.

10. The wheel game of chance apparatus of claim 8 wherein the thickened central section provides a central shaft tube, whereby the resilient compressible gear may be mounted on a rod member internally penetrating the central shaft tube.

11. The wheel game of chance apparatus of claim 9 wherein the thickened central section provides a central shaft tube, whereby the resilient compressible gear may be mounted on rod member internally penetrating the central shaft tube.

12. The wheel game of chance apparatus of claim 4 also having a plurality of additional gears, each said additional gear having resilient, deflectable gear teeth matingly engaging the drive teeth in a corresponding one of the three game wheels to support rotation of the corresponding one game wheel within the apparatus.

13. The wheel game of chance apparatus of claim 5 wherein the additional gears each comprise softer material than correspondingly located portions of the resilient driven gears.

14. A wheel game of chance apparatus of the type providing an award to a player playing the wheel game of chance apparatus, the apparatus comprising in combination:

A at least a first game wheel having drive teeth in the periphery of the first game wheel;

B. a wheel drive mounted in the apparatus and having a resilient drive gear with resilient, compressible drive teeth matingly engaging the drive teeth in the first game wheel; and C. a plurality of spaced-apart resilient idler gears, each idler gear having resilient, compressible idler gear teeth matingly engaging the drive teeth in the first wheel game whereby the resilient drive gear and reliant idler gears support the first game wheel in the wheel game of chance apparatus.

15. The wheel game of chance apparatus of claim 14 wherein the resilient, compressible chive gear teeth comprise a harder material than the resilient, compressible idler gear teeth in at least one among said plurality of idler gear.

16. The wheel game of chance apparatus of claim 14 wherein the resilient drive gear comprises a thick-thin-thick cross section.

17. The wheel game of chance apparatus of claim 15 wherein the resilient drive gear comprises a thick-thin-thick cross section.

18. The wheel game of chance apparatus of claim 14 wherein each resilient idler gear comprises a thick-thin-thick cross section.

19. The wheel game of chance apparatus of claim 15 wherein, at least one resilient idler gear comprises a thick-thin-thick cross section.

20. The wheel game of chance apparatus of claim 17 wherein at least one resilient idler gear comprises a thick-thin-thick cross section.

* * * * *